United States Patent
Feser

[15] 3,653,677
[45] Apr. 4, 1972

[54] TRAILER SNOW SLED

[72] Inventor: Emmett John Feser, P.O. Box 115, Rockyford, Alberta, Canada

[22] Filed: Oct. 14, 1969

[21] Appl. No.: 866,246

[30] Foreign Application Priority Data

Aug. 18, 1969 Canada..................................059,762

[52] U.S. Cl......................................280/8, 280/24, 280/25
[51] Int. Cl..........................................B62b 13/18
[58] Field of Search ..................................280/8–11, 13, 14, 280/24, 25

[56] References Cited

UNITED STATES PATENTS

| | | | |
|---|---|---|---|
| 1,101,458 | 6/1914 | Levoy et al............................ | 280/9 UX |
| 1,164,228 | 12/1915 | Seufer...................................... | 280/9 |
| 1,308,937 | 7/1919 | Crane........................................ | 280/8 |
| 2,743,112 | 4/1956 | Lambert.................................... | 280/9 |
| 3,503,620 | 3/1970 | Koskovich et al. ....................... | 280/11 |

*Primary Examiner*—Benjamin Hersh
*Assistant Examiner*—Winston H. Douglas
*Attorney*—Cushman, Darby & Cushman

[57] ABSTRACT

A trailer type vehicle having an undercarriage longitudinally adjustably attached to a load carrying body and convertible to provide sled runner supporting assemblies or wheeled supporting assemblies to enable the vehicle to be used under various conditions behind a towing vehicle such as a "snowmobile," automobile or the like.

5 Claims, 5 Drawing Figures

PATENTED APR 4 1972
3,653,677
SHEET 1 OF 2
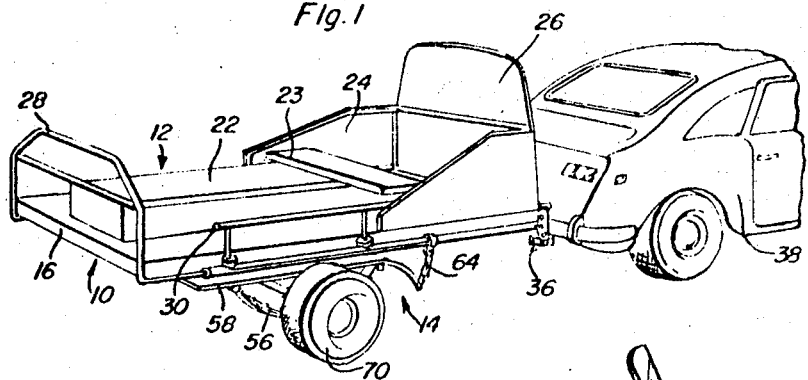
Fig. 1
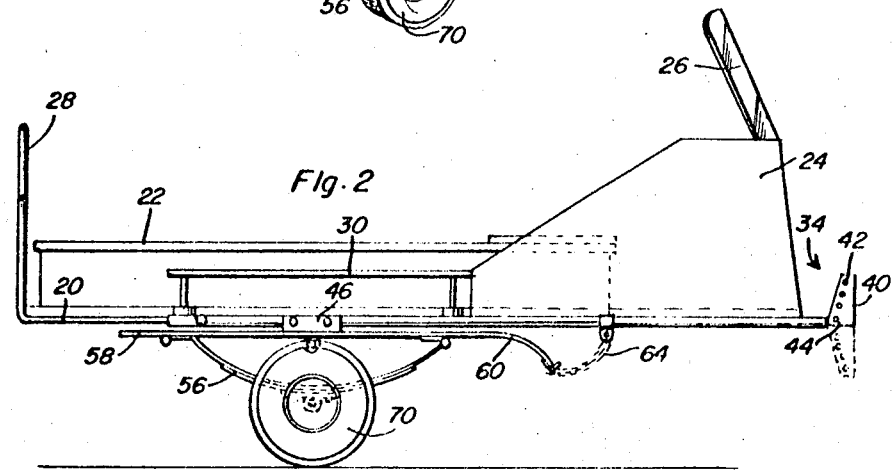
Fig. 2
Fig. 5
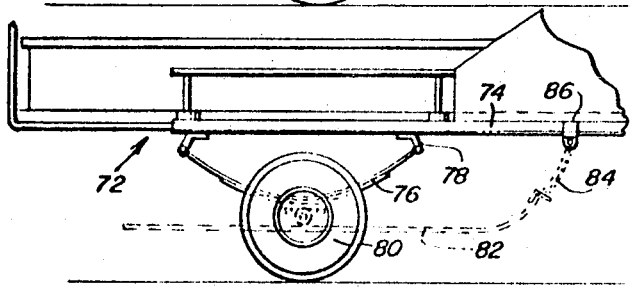
INVENTOR
EMMETT J. FESER
BY
Cushman, Darby & Cushman
ATTORNEYS

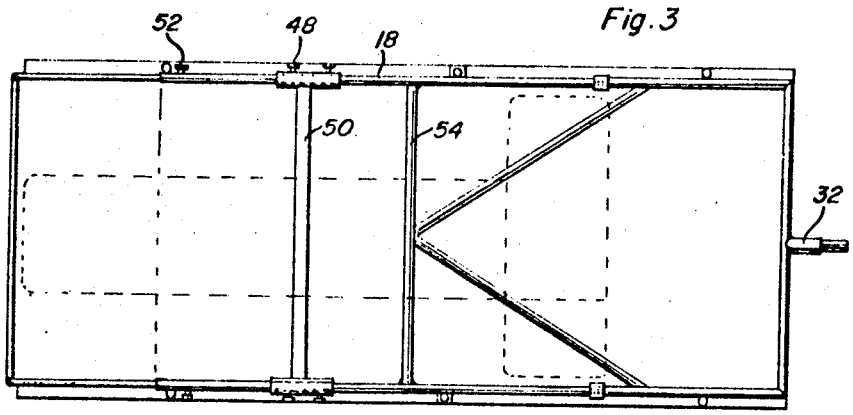
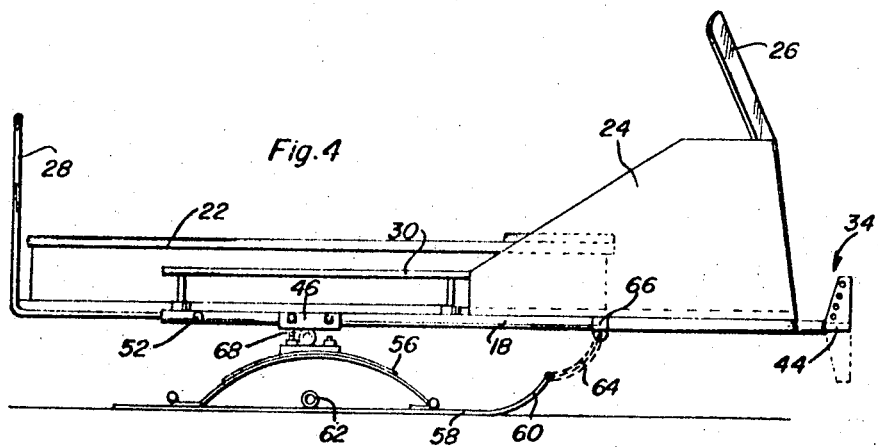

TRAILER SNOW SLED

The present invention generally relates to a trailer vehicle having an undercarriage adjustably connected to a load carrying body and convertible to provide sled runner support or wheeled support.

An object of the present invention is to provide a trailer vehicle having a spring suspension assembly in the form of bowed leaf springs extending longitudinally of the vehicle body for resilient support thereof with the spring assemblies supporting either a sled runner or wheel assembly in position for engagement with a supporting surface.

Another object of this invention is to provide a trailer vehicle having interchangeable wheel and ski runner assemblies for year-round usability.

Another object of this invention is to provide a trailer vehicle with interchangeable wheels and ski runners which can be conveniently used with the wheel assembly in operative position to transport a snowmobile behind an automobile, and which can then be converted to snow surface use with the ski runner assembly in operative position, as a trailer behind the snowmobile.

Another object of this invention is to provide a trailer vehicle having a load carrying body and an undercarriage therefor and an adjustable connection therebetween to enable longitudinal adjustment of the point of support of the body to vary the balance characteristics thereof, thereby enabling the load to be positioned to best advantage.

A further object of the present invention is to provide a trailer vehicle which is simple in construction, effective in operation and generally inexpensive to manufacture.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIG. 1 is a perspective view of the trailer vehicle of the present invention with the wheels in use;

FIG. 2 is a side elevational view of the trailer illustrated in FIG. 1;

FIG. 3 is a top plan view of the trailer vehicle frame;

FIG. 4 is a side elevational view of the vehicle with the sled runners in use; and FIG. 5 is a side elevation view of another embodiment of the invention.

Referring now specifically to the drawings, the trailer vehicle is generally designated by numeral 10 and includes a load carrying body 12 and an undercarriage 14. The body 12 includes a floor 16 supported by a frame 18 which includes side frame rails 20. Mounted on the floor 16 is a longitudinal raised seat 22 and a transverse seat 23 at the front of the vehicle.

An upstanding front wall 24 having a transparent shield 26 thereon is mounted at the forward end of the vehicle to protect persons occupying the seats. The rear of the body includes a guard rail 28 and side guard rails 30 extend along the sides of the vehicle with the guard rails forming part of the frame 18.

The forward end of the frame 18 has a longitudinally adjustable tongue 32 having a hitch assembly 34 for connection with a connector 36 on a towing vehicle 38 such as an automobile or snowmobile. The hitch assembly 34 includes a plate 40 having a plurality of apertures 42 vertically spaced therein. The plate 40 is mounted on a rod 44 rotatably adjustably secured in the end of the tubular tongue 32 for enabling the point of connection with the vehicle 38 to be vertically adjusted.

The frame 18 has a pair of sleeves 46 slidably mounted on the side rails of the frame which are secured in adjusted position by set screws 48, bolts or the like. Extending between the sleeves 46 and rigidly connected therewith is a tubular axle 50 which can be adjusted between a stop pin 52 and a cross member 54. The undercarriage 14 includes a pair of bowed leaf spring assemblies 56 having the ends thereof attached to a pair of sled runners or skis 58 having curved forward ends 60. Attached centrally of each ski 58 is a sleeve 62 alignable with the tubular axle 50 for receiving a retaining pin to retain the ski 58 in inverted position along the underside of the frame 18 as illustrated in FIGS. 1 and 2. A flexible member 64 such as chain interconnects the forward end of a ski and a bracket 66 on frame 18.

Centrally mounted on each spring assembly 56 is a tubular sleeve 68 on the convex side of the spring for receiving a stub axle on a wheel assembly 70 to enable spring support of the body from the wheel assemblies 70 for over-the-road towing of the trailer. When it is desired to tow the trailer over snow, the wheel assemblies 70 are removed and the skis 58 with the spring assemblies 56 attached are inverted with the sleeve 68 being connected with the tubular axle 50 as illustrated in FIG. 4.

FIG. 5 illustrates an alternative structure in which the trailer 72 includes a frame 74 supported by leaf spring assemblies 76 supported by shackles 78 attached to the frame 74. A wheel assembly 80 is detachably supported from the spring assembly 76 with a ski or sled runner 82 being alternately supported from the spring assembly 76 as illustrated in dotted line in FIG. 5. The ski 82 has a flexible chain 84 attached to the forward end thereof with the chain being connected to bracket 86 on frame 74 thus serving to retain the skis 82 in properly aligned relation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A trailer vehicle convertible from a wheeled vehicle to a vehicle with snow skis comprising a frame with load supporting means thereon, means at the forward end of the frame for towing connection with a towing vehicle such as a wheeled towing vehicle or a snowmobile, spring means disposed below the frame in supporting engagement therewith, and means on said spring means for alternately supporting a wheel assembly and a ski from the frame;

said spring means including a bowed leaf spring assembly extending longitudinally of said frame;

the said means on the spring means including a bracket centrally on the leaf spring assembly for supporting a wheel when the convex surface of the spring assembly faces downwardly, said ski being connected to the ends of said leaf-spring assembly and disposed in inverted position along and under the frame and means on the lower surface of the inverted ski in supporting engagement with the frame.

2. The structure as defined in claim 1 wherein said spring means includes means longitudinally adjustably connected to the frame for varying the point of supporting engagement with the frame.

3. The structure as defined in claim 2 wherein said means on the spring assembly includes a sleeve centrally of the leaf spring assembly for detachably receiving a supporting pin.

4. The structure as defined in claim 3 wherein said supporting pin is mounted on a supporting wheel or a ski.

5. The structure as defined in claim 3 wherein a ski extends between the ends of the spring assembly, means on said ski engaged with the frame when the ski is in inverted position under the frame for attaching the spring assembly thereto.

* * * * *